United States Patent [19]
Mueller

[11] 3,820,878
[45] June 28, 1974

[54] SPECTRAL ZONAL INFORMATION STORAGE AND RETRIEVAL
[75] Inventor: Peter F. Mueller, Concord, Mass.
[73] Assignee: Technical Operations, Incorporated, Burlington, Mass.
[22] Filed: Nov. 2, 1972
[21] Appl. No.: 303,092

Related U.S. Application Data
[60] Division of Ser. No. 130,163, April 1, 1971, Pat. No. 3,719,127, which is a continuation-in-part of Ser. No. 726,455, May 3, 1968, Pat. No. 3,664,248, which is a continuation-in-part of Ser. No. 564,340, July 11, 1968, abandoned.

[52] U.S. Cl............................. 350/317, 350/162 SF
[51] Int. Cl. ............................................. G02b 5/22
[58] Field of Search ...................... 350/317, 162 SF

[56] References Cited
UNITED STATES PATENTS
2,673,923   3/1954   Williams.............................. 350/317
3,410,626   11/1968  Macgrath........................... 350/317
3,585,284   6/1971   Macovski ..................... 350/162 SF FOREIGN PATENTS OR APPLICATIONS
816,298   7/1959   Great Britain..................... 350/317

Primary Examiner—Ronald L. Wibert
Attorney, Agent, or Firm—Alfred H. Rosen; Frank A. Steinhilper

[57] ABSTRACT

This disclosure depicts methods and means for implementing a novel optical information processing technique utilizing a phenomena (herein termed Fourier optical synthesis) involving effecting a complex amplitude addition of diffraction spectra characterizing two or more object functions. The processed object functions may represent totally different scenes, or color separation functions of a common colored scene. The disclosure stresses novel mosaic three zone spectral zonal encoding filters and methods of color information storage and retrieval using the novel filters.

21 Claims, 29 Drawing Figures

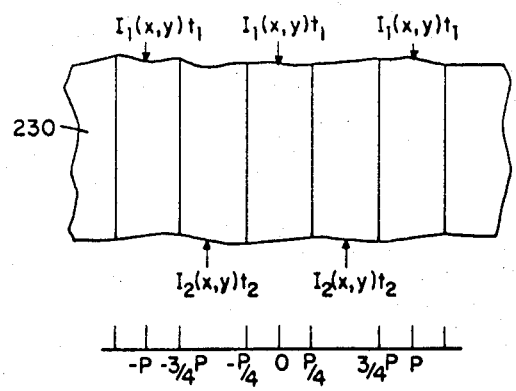
FIG. 1
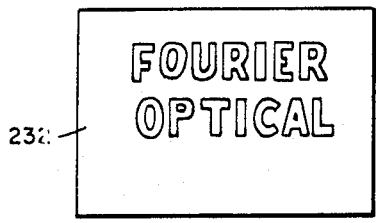
FIG. 2
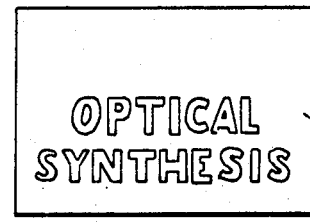
FIG. 3
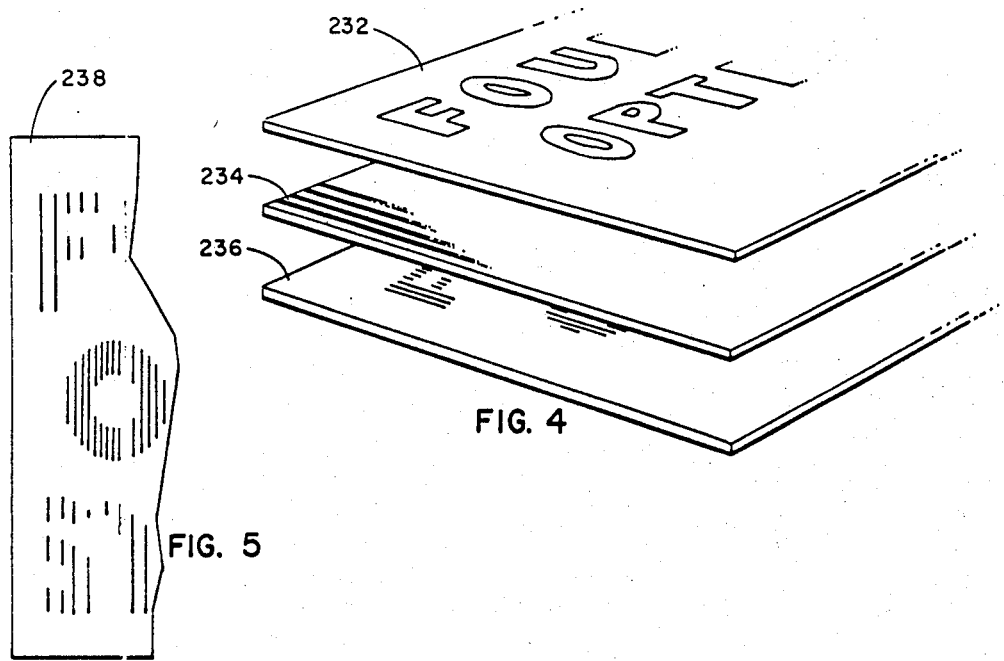
FIG. 4
FIG. 5

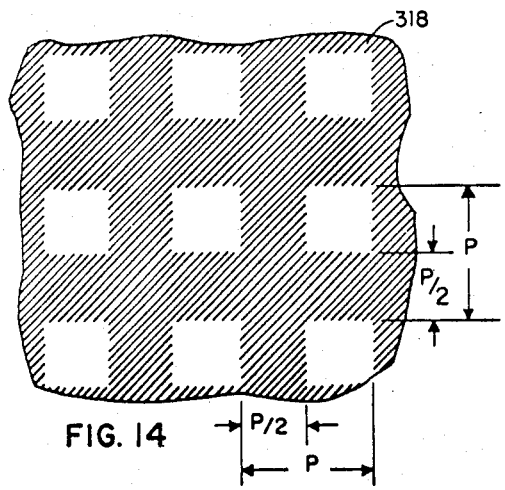
FIG. 14
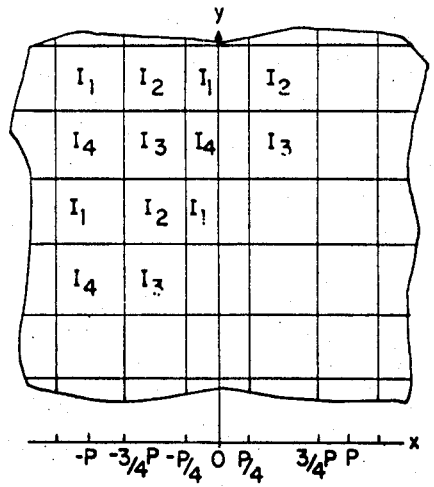
FIG. 15
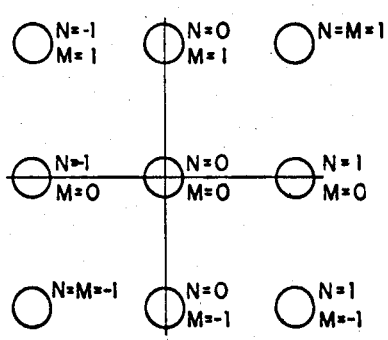
FIG. 16
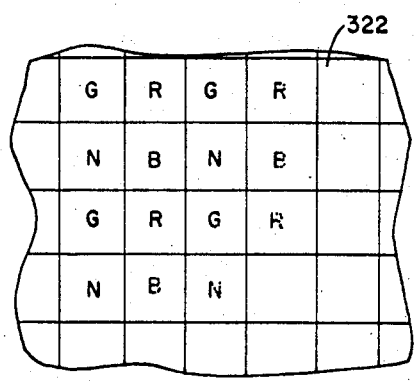
FIG. 17
FIG. 18
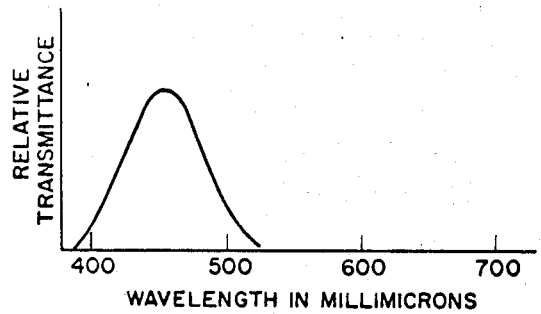

SPECTRAL ZONAL INFORMATION STORAGE AND RETRIEVAL

This application is a division of application Ser. No. 130,163, filed Apr. 1, 1971 now U.S. Pat. No. 3,719,127, which is a continuation-in-part of application Ser. No. 726,455, filed May 3, 1968, now U.S. Pat. No. 3,664,248, which was in turn a continuation-in-part of application Ser. No. 564,340, filed July 11, 1966 and now abandoned; and is related to application Ser. No. 795,879, filed Feb. 3, 1969, now U.S. Pat. No. 3,586,434 which was a continuation of the aforesaid abandoned application Ser. No. 564,340.

BACKGROUND OF THE INVENTION

The invention disclosed and claimed in the above-referenced application Ser. No. 726,455, now U.S. Pat. No. 3,664,248, broadly concerns a technique for optically processing information which exploits a phenomenon (herein termed Fourier optical synthesis) in which spatial frequency spectra characterizing a plurality of optically additive object functions which are respectively multiplied with harmonically related carrier functions can be caused to add in complex amplitude in a Fourier (frequency) space established in a coherent optical detection system.

This invention is concerned with one aspect of this broad inventive concept. More particularly, this invention concerns methods and means for implementing spectral zonal photostorage and retrieval according to the said invention, especially by the use of novel mosaic three-zone encoding filters. Spectral zonal filters according to this invention are capable of encoding three spectral zonal images such that they may be recorded photographically, for example, and selectively retrieved by the use of optical Fourier transform and frequency filtering techniques.

The filters for implementing this invention comprise a two-dimensional pattern of mosaic filter units, each unit comprising four filter elements having different spectral characteristics. The filters, at first glance, appear to resemble certain of the mosaic screen plate filters fabricated circa the turn of the century to implement color photography by the so-called "screen plate" method. For example, see U.K. Pat. No. 23,812 (1907) – Child and U.K. Pat. No. 6,881 (1906) – Smith.

It is important to understand, however, that the filters described in the referenced patents are far removed from the filters of this invention in a number of important respects. First, they are used to record elemental samples of color separation information for later direct viewing through the same (or an identical) filter. By integration of the light coming from a number of adjacent elements, the color value of the sum of a number of color elements is perceived. Stated another way, in the screen plate method of spectral zonal photography, color information is both stored and restored at the record on an element-by-element basis.

Second, the color separation information is not intended to be retrieved (and, in fact, is incapable of being retrieved) by the demodulation of spatial carriers using optical Fourier transform and filtering techniques, as is the case with information stored by the use of the filters of this invention.

Further, the construction and spectral characteristics of these prior art filters is very different from that of the filters described and claimed herein. The desirable spectral characteristics of screen plates is discussed in some detail in History of Three-Color Photography, American Photographic Pub. Co., (1925) by Wahl. As described in this reference, it is desirable that screen plates have no neutral areas, and mandatory that they have no neutral areas with high transmissivity. As will become evident from the ensuing description and claims, one requirement for the filters of this invention is that one of the elements of each mosaic unit have neutral spectral characteristics.

Another important distinction lies in the different geometry of the filters — the prior art screen plate filters in general comprise mosaic units having three elements (usually red, blue, and green). The mosaic units in the filters of the subject invention have four elements — three having different spectral bandpass characteristics and the fourth being a neutral element.

Perhaps more germane prior art with respect to the filters of the subject invention are the striped spectral zonal filters which have evolved during development of the art of diffraction photochromy. For example, see U.S. Pat. No. 2,813,146 – Glenn (reissued as U.S. Pat. No. Re 25,169); U.S. Pat. No. 3,378,633 – Macovski; U.S. Pat. No. 3,378,634 – Macovski; and U.S. Pat. No. 3,470,310 – Shashoua.

During the evolution of color television striped filters were developed which had the property that when multiplied with a scene image, color signals are impressed on spatial carriers of different frequencies. Scanning such a carrier-encoded image places distinct color information on temporal carriers of different frequencies, thus allowing the discrete color signals to be separated by frequency filtering in Fourier domain. Examples of this approach are: U.S. Pat. Nos. 2,733,291 and 2,736,762 – Kell; U.S. Pat. No. 2,736,761 – Sziklai; and U.S. Pat. Nos. 3,291,901 and 3,300,580 – Takagi. Another type of striped filter used in the dot sequential method of color television was widely explored in the late 1940's and 50's. An early example of this work is found in U.S. Pat. No. 2,452,293 – De Forest.

Yet another color encoding filter for use in making half-tone screen plates is described and claimed in U.S. Pat. No. 3,085,878 – Archer. A cursory inspection of each of these prior art patents will reveal the lack of pertinence thereof with respect to the novel mosaic filter described herein.

OBJECTS OF THE INVENTION

It is an object of this invention to provide methods and apparatus for recording and retrieving spectral zonal information.

It is another object to provide improved methods of diffraction process color storage and retrieval which is substantially free from cross-talk limitations imposed by prior art diffraction processes.

It is another object to provide improved spectral zonal encoding filters for use in making records from which spectral zonal information can be retrieved in a coherent optical projector by Fourier transformation and processing techniques.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention reference may be had to the following detailed description taken in connection with the accompanying drawings wherein:

FIG. 1 is a schematic illustration, grossly distorted for clarity, of a composite record comprising interlaced record functions useful in the practice of this invention;

FIGS. 2 and 3 show hypothetical objects useful in an illustration of the principles and practice of the invention;

FIG. 4 is a schematic exploded view of one step of a two-step contact printing process which may be employed in the fabrication of a composite optical record useful in the practice of my invention;

FIG. 5 is a composite record comprising interlaced images of the objects shown in FIGS. 2 and 3 which might be formed by the process illustrated in FIG. 4;

FIG. 14 shows a mask for assisting in interlacing on a common recording medium images of the objects in FIGS. 10-13;

FIG. 15 depicts a composite record fabricated in the form of a mosaic, the mosaic comprising a plurality of mosaic units each having four elements representing four distinct record functions;

FIG. 16 portrays a portion of the diffraction pattern which might be formed in a Fourier transform space established within a coherent optical system, such as shown in FIG. 6 of the FIG. 10 record;

FIG. 17 illustrates a spectral zonal filter implementing the principles of this invention;

FIGS. 18-20 are diagrammatic representations of suitable spectral characteristics for blue, green, and red filter elements in the FIG. 17 filter;

DESCRIPTION OF THE PREFERRED EMBODIMENTS

Figure 6:
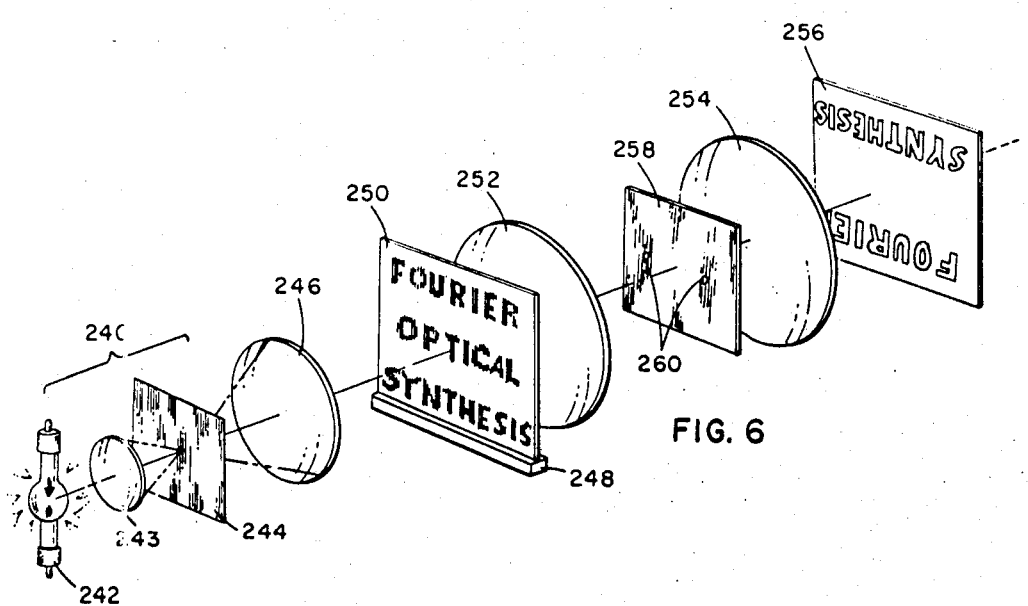
FIG. 6 illustrates, schematically and in exaggerated scale, a coherent optical detection system for performing Fourier optical synthesis in accordance with the invention.

The conceptual foundation of this invention, in a broad sense, as described and claimed in the above-referenced copending application Ser. No. 726,455, involves additively combining a plurality of record functions respectively multiplied with harmonically related carrier functions, and, using Fourier transformation and spatial filtering techniques in a coherent optical retrieval system, detecting selected functions representing complex amplitude additive (including subtractive) combinations of the spatial frequency spectra characterizing said record functions. The complex addition of the record function spectra is accomplished by effecting an optical interlacing of the record functions, either during the recording process (e.g., by effecting formation of a composite record having the plurality of functions interlaced thereon), or alternatively, in a direct retrieval step (e.g., by effectively interlacing in space the separate carrier modulating record functions).

As will become evident from the following description, an important aspect of the described information processing concept lies in the establishment of a predetermined spatial phase relationship between the optically multiplexed record functions in order to achieve complex amplitude substraction of the diffraction spectra produced by the respective record functions. In the interest of simplifying the ensuing description without intending a limitation on the scope of the underlying principles, this phenomenon of complex amplitude addition of the diffraction spectra of different record functions is hereinafter termed Fourier optical synthesis.

In order to further the understanding of the phenomenon of Fourier optical synthesis, a mathematical analysis will be undertaken. The principle is general and may be treated two-dimensionally. However, in the interest of simplicity, the immediate analysis will be undertaken in one dimension only. Again, although the underlying mathematical and physical concepts are completely general, the immediate description will be in terms of a recording process involving the formation of a composite optical record comprising two interlaced record functions. FIG. 1 depicts such a composite record 230. The record may be formed as follows. A first record function representing an image intensity distribution $I_1(x,y)$ is multiplied by a one-dimensional periodic carrier function $P(x)$ described as:

$$P(x) = 1 \text{ when } x < p/4$$
$$= 0 \text{ when } p/4 < x < 3p/4$$
$$= 1 \text{ when } 3p/4 < x < p$$

and (1)

$$P(x \pm np) = P(x)$$

with $$n = 0, 1, 2, 3.$$

A photographic emulsion is exposed to the resulting product for time $t_1$. A second record function representing an image intensity distribution $I_2(x,y)$ is then multiplied by a periodic carrier function $P'(x)$, $P'(x)$ representing $P(x+p/2)$, and this product is added to the product of $I_1(x,y)$ and $P(x)$ by exposing the same emulsion to $I_2(x,y) P'(x)$ for a time interval $t_2$, the composite record 230 thus formed comprising an interlace of $I_1(x,y)$ and $I_2(x,y)$ with a half-period relative spatial phase displacement.

The amplitude transmittance of the record 230, after processing, can be described as follows:

$$T_A(x,y) = K_1[I_1(x,y)]^{-\gamma/2}P(x) + K_2[I_2(x,y)]^{-\gamma/2}P'(x) \quad (2)$$

where $$K_1 = t_1^{-\gamma/2}/E_b^{-\gamma/2}$$

$E_b$ is the abscissa intercept and $\gamma$ is the slope of the processing density-log exposure curve.

The Fourier transform of Eq. (2) is $$\tilde{T}_A(\mu_x, \mu_y) = \int_{-\infty}^{\infty}\int_{-\infty}^{\infty} [(K_1[I_1(x,y)]^{-\gamma/2}P(x)$$
$$+ K_2[I_2(x,y)]^{-\gamma/2}P'(x))]e^{2\pi i(\mu_x x + \mu_y y)}dxdy \quad (3)$$

If we let $$F_1(\mu_x, \mu_y) = \int\int K_1[I_1(x,y)]^{-\gamma/2}e^{2\pi i(\mu_x x + \mu_y y)}dxdy \quad (4)$$

and $$F_2(\mu_x, \mu_y) = \int\int K_2[I_2(x,y)]^{-\gamma/2}e^{2\pi i(\mu_x x + \mu_y y)}dxdy \quad (5)$$

then by the convolution theorem $$\tilde{T}_A(\mu_x, \mu_y) = \int_{-\infty}^{\infty} F_1(\mu_x-\sigma, \mu_y)\tilde{P}(\sigma)d\sigma$$
$$+ \int_{-\infty}^{\infty} F_2(\mu_x-\sigma, \mu_y)\tilde{P}'(\sigma)d\sigma \quad (6)$$

where $\sigma$ is a dummy variable of integration.
But $$\tilde{P}(\sigma) = \sum_{n=-\infty}^{\infty} \int_{np-p/4}^{np+p/4} (1)e^{2\pi i\sigma x}dx \quad (7)$$

$$= (1/2) \text{ sinc } 2\pi\sigma p/4 \sum_{n=-\infty}^{\infty} \delta(\sigma - n/p) \quad (8)$$

Similarly, $$\tilde{P}'(\sigma) = \sum_{n=-\infty}^{\infty} \int_{np+p/4}^{np+3p/4} e^{2\pi i\sigma x}dx \quad (9)$$

$$\tilde{P}'(\sigma) = e^{2\pi i\sigma p/2}(1/2) \text{ sinc } 2\pi\sigma p/4 \sum_{-\infty}^{\infty} \delta(\sigma - n/p) \quad (10)$$

$$\tilde{P}'(\sigma) = e^{2\pi i\sigma p/2}\tilde{P}(\sigma) \quad (11)$$

Substituting Eq. (8) and (10) into Eq. (6) yields $$\tilde{T}_A(\mu_x, \mu_y) = \int_{-\infty}^{\infty} F_1(\mu_x-\sigma, \mu_y)(1/2) \text{ sinc } 2\pi\sigma p/4$$
$$\sum_{n=-\infty}^{\infty} \delta(\sigma - n/p)d\sigma$$
$$+ \int_{-\infty}^{\infty} F_2(\mu_x-\sigma, \mu_y)e^{2\pi i\sigma p/2}(1/2) \text{ sinc }$$
$$2\pi\sigma p/4 \sum_{n=-\infty}^{\infty} \delta(\sigma - n/p)d\sigma \quad (12)$$

Translated into physical terms, equation (12) states that a Fourier transformation of the complex amplitude transmittance of the record 230, processed to a photographic transparency comprises a convolution of the spatial frequency spectrum of $I_1(x,y)$ with a Dirac delta function array of infinite components produced by carrier function $P(x)$ summed with a convolution of the spatial frequency spectrum of $I_2(x,y)$ with a Dirac delta function array produced by carrier function $P'(x)$. It is important to note, for reasons which will become more apparent below, that the spatial displacement between carrier functions $P(x)$ and $P'(x)$ has been transformed by operation of the Fourier integral into a linear phase factor $e^{2\pi i \sigma p/2}$, appearing in the second term of equation (12).

Considering only the spectra convolved about the delta functions associated with the (common) fundamental frequency ($\sigma = 1/p$) of carrier functions $P(x)$ and $P'(x)$, i.e., the harmonic order $n=1$ (assuming in the interest of simplicity, $I_1$ and $I_2$ to be frequency limited to $1/2p$, $$\tilde{T}_A(\mu_x,\mu_y)|_{n=\pm1} = F_1(\mu_x-1/p,\mu_y)(1/2)\text{sinc}\pi/2 + F_2(\mu_x - 1/p,\mu_y)(1/2)e^{\pi i}\text{sinc}\pi/2$$

(13)

$$= (1/\pi)[F_1(\mu_x - 1/p,\mu_y) - F_2(\mu_x - 1/p,\mu_y)].$$

(14)

Thus, equation (14) reveals that a complex amplitude spectral difference function is generated in the Fourier domain.

Retransformation of equation (14) by the inversion theorem in cartesian coordinates $u,v$ given $$T_A(u,v) = (1/\pi)e^{2\pi i u/p}[K_1[I_1(u,v)]^{-\gamma/2} - K_2[I_2(u,v)]^{-\gamma/2}].$$

(15)

Thus, the complex amplitude distribution of the operational transform of the spectral difference function defined by equation (14) represents a difference between the images of $I_1(x,y)$ and $I_2(x,y)$ formed independently. When $\gamma = -2$ (I have not found this to be a strict constraint) and $t_1 = t_2$, there is generated the complex amplitude difference function $$T_A(u,v) = (1/\pi)ke^{2\pi i u/p}|I_1(u,v) - I_2(u,v)| = (1/\pi)ke^{2\pi i u/p}\Delta I(u,v)$$

(16)

which may be recorded by conventional square law detectors as the intensity distribution $$I_{out}(u,v) = (k/\pi)^2 (\Delta I(u,v))^2$$

(17)

The simplified one-dimensional mathematical description above is sufficient to illustrate certain basic concepts underlying my invention. These are that at some stage of the information processing, the record functions desired to be synthesized are respectively multiplied with a substantially periodic carrier function and then caused, as by interlacing, to be optically additive. The retrieval operation is accomplished, as will be described in more detail hereinafter, in a coherent optical system within which is established a so-called Fourier transform space containing a convolution of a spatial frequency spectrum associated with each of the records with a Dirac delta function array. By the selection of carrier functions having one or more like harmonic components and by effectively aligning the carrier functions (inherently achieved in an interlace geometry) a spectral order associated with each of the record functions is caused to coincide in transform space at least once. By establishing a predetermined displacement between the spatial phase of the carrier functions impressed on the record functions, there is caused a complex amplitude subtraction of the spectra of the first and second record functions. Retransformation of the difference function thus formed produces a two-dimensional display which represents the optical difference between the first and second record functions.

In a simple but dramatic application, my invention may be used to effect an optical subtraction of two totally different record functions.

Assume the functions to be synthesized comprise the words "FOURIER OPTICAL" as shown on record 232 in FIG. 2, and the words "OPTICAL SYNTHESIS" as shown on record 233 in FIG. 3.

To prepare a composite optical record as described mathematically above, conventional photographic contact printing techniques may be used, although other methods are suitable. FIG. 4 is a schematic exploded view of the contact printing method being applied, illustrating a portion of the record function 232 being contact printed through a grating mask 234 to form an image on a photosensitive material 236 which represents a multiplication of the record 232 with the mask 234. The second record 233 is interlaced with the first record 232 by replacing the record 232 with record 233, shifting the grating mask 234 a distance equal to one-half the period "$p$" of the grating and exposing the photosensitive material 236 a second time. The composite record 238 thus formed would appear as shown in part in FIG. 5, the composite record function comprising the modulated words "FOURIER OPTICAL" being interlaced with the second record function comprising the words "OPTICAL SYNTHESIS." Thus, the composite record 238 represents an additive combination of two record functions respectively multiplied with spatial carriers having a half-period spatial phase displacement.

Various techniques may be employed for retrieving from the composite record 238 a function representing the difference in complex amplitude transmittance hereinafter termed, in the interest of convenience, the optical difference between the records 232 and 233. FIG. 6 schematically shows a system for effecting retrieval of the described optical difference function. The FIG. 6 system is illustrated as including light source means 240, comprising an arc lamp 242, lens 243, and apertured mask 244, for generating an effective point source of high intensity luminous energy, a collimating lens 246, and a film gate 248 for supporting an optical record 250. A transform lens 252 cooperating with the collimating lens 246 forms an image of the effective point source at a plane termed the Fourier transform plane at which appears a Fraunhofer diffraction pattern of the record 250. A projection lens 254 together with the transform lens 252 images the record 250 upon a display screen 256. The effective point source created by the light source means aperture mask 244 and the collimating lens 246 produces optical wavefronts having sufficient spatial coherence to produce a diffraction pattern at the described Fourier transform plane which substantially represents a Fourier transformation of the complex amplitude distribution across the record 250. In general, the diffraction pattern of the record 250 represents a convolution of a spatial frequency spectrum characterizing the record distribution with a Dirac delta function array produced by carriers on the record 250. In the illustrated example, the record functions are multiplied with azimuthally aligned carriers of like periodicity, and thus the Dirac delta function array produced by each of the record functions is coincident in the Fourier transform space. However, by this invention, the spatial carriers respectively modulated by the record functions have a spatial phase displacement equal to one-half the fundamental carrier period $p$. Thus, the complex amplitude distributions produced by the two record functions will destructively interfere in the Fourier transform space to produce a difference function representing a complex amplitude subtraction of one record function from the other. This difference function may be selectively transmitted through the Fourier transform space by placing a spatial filter mask 258 in the Fourier transform space which has a pair of separately located apertures 260 therein for transmitting the fundamental ($n = 1$) diffraction orders produced by the record 250. Thus, the display produced on the screen 256, comprising the words "FOURIER SYNTHESIS" represents the optical difference between the record functions "FOURIER OPTICAL" and "OPTICAL SYNTHESIS."

It is important to note that the complex amplitude addition (including subtraction) can be accomplished by forming the record functions to be synthesized in incoherent light and thus without the attendance of the numerous limitations imposed by having to perform the recording step in coherent light as is required with holographic image synthesis techniques. It is also evident that the mode of operation of my invention is substantially different from that of holographic techniques in that, inter alia, the complex amplitude addition occurs in Fourier transform space, rather than at the eventual output plane.

The illustrated photostorage and retrieval method and system is not to be interpreted as being limiting in any sense. Numerous other techniques are contemplated by this invention for achieving synthesis of optical functions in accordance with the above-described principles. For example, there is no limitation on the practice of this invention to the synthesis of binary images—as noted from the mathematical analysis, the nature of the record functions which may be synthesized is unrestricted. Continuous tone amplitude or phase images may be synthesized by my technique. The geometry of the carriers with which the record functions to be synthesized are multiplied is again substantially without limitation. For example, (as related to the described contact printing method) the transparent slits may be made much narrower than the opaque bars. Although a record thus formed would be inefficient in its utilization of the film area, the operation of the principles of the invention are not affected and complex amplitude addition would take place as described.

Alternatively, the transparent areas of the grating mask may in fact be greater than one-half the grating period. The result of the use of such a grating geometry is that the interlaced record functions will overlap along the elemental strip image margins. However, if the optically additive relationship between the two record functions is maintained, the operation of the principles of the invention are not violated. In order to preserve this additive relationship, the composite record preferably is linearly processed to a gamma of minus two in order that the complex amplitude transmission of the record is substantially linearly related to the intensity of the recording illumination. This restraint is not restrictive; it has been found that considerable latitude in processing may be tolerated without significantly affecting the equality of the recovered images.

It is noted that optical subtraction may be achieved, as described, independent of the polarity of the processed composite record since it is a difference function, not an absolute function, which is sought.

A very significant application of the principles of my invention, described in part above, is in the field of spectral zonal photography. The production of true color reproductions of a colored photographic scene has engaged workers in the photographic arts since the beginnings of practical photography. One path along which studies were conducted has led to the development of photosensitive materials capable of photostoring color information directly in all the hues of the scene. Another parallel path has been in the direction of storing color information on panchromatic black-and-white film including techniques to retrieve the original color values from the colorless record. A very substantial effort some years ago was concentrated on the concept of zonal recording of color information by imaging the photographic scene through a one (or two) dimensional mosaic spectral filter onto black-and-white photostorage materials. See the above-referenced U.K. patents to Child and Smith. Retrieval of the color information from the black-and-white record by this "screen plate" method requires exact registration of the developed record with the taking filter to form a true color reproduction of the scene. The registration and resolution problems inherent in this method have proven to be insurmountable obstacles to the commercial viability of this approach.

Yet another approach has involved the use of diffraction gratings to color code a black-and-white record. Such a technique is described in the British Journal of Photography, August 3, 1906, pages 609–612 by Herbert E. Ives; in a United States Patent to R. W. Wood, U.S. Pat. No. 755,983, and in a U.S. Patent to Carlo Bocca, U.S. Pat. No. 2,050,417. However, none of these proponents of the use of gratings to color code information on black-and-white film succeeded in avoiding the need to make a plurality of color separation records, and thus their attempts again encompassed the registration limitation. Ives and Wood employ diffraction gratings of disparate frequencies to enable the detection of particular color information in a black-and-white record; however, such methods were plagued by Moire interactions between the gratings. W. E. Glenn has also encountered these Moire beating effects in his exploration of the use of disparate frequency gratings in color systems, particularly in applications to variable optical retardation systems utilizing deformable thermoplastic recording media (see Vol. 48, No. 11, pp. 841–3 of the Journal of the Optical Society of America).

As suggested, techniques of Fourier optical synthesis may be utilized to photostore and retrive color imagery from a colorless recording medium without many of the problems inherent in the above-described prior art techniques.

I will explain below how by this invention Fourier optical synthesis may be implemented in three-zone spectral zonal photography. However, in the interest of simplicity in understanding the conceptual foundation and practice of spectral zonal photography according to Fourier optical synthesis, I will first describe a two-color system of spectral zonal photography utilizing but a single one-dimensional carrier function during the storage process.

Figure 7:
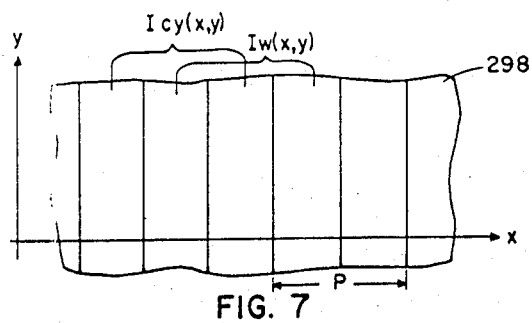
FIG. 7 is a view of a composite optical record formed as a step in a technique of two-color spectral zonal photography implementing my invention.

A preferred way of implementing such a two-color system is to effect an interlacing on a common black-and-white panchromatic recording medium of two record functions $I_{cy}(x,y)$ and $I_w(x,y)$, $Icy(x,y)$ representing a cyan color separation image of a colored photographic object and $I_w(x,y)$ representing a full spectrum (herein termed for convenience "white") image of the same object. FIG. 7 illustrates, very schematically, how such a composite record 298 might appear.

The amplitude transmittance of record 298 processed to a transparency is given by the relation:

$$T_A(x,y) = I_{cy}(x,y) \, P(x) + I_w(x,y) \, P(x+p/2)$$

(18)

where $P(x)$ is as described in equation (1).

Fourier transforming equation (18) (for example, with a coherent optical system such as shown in FIG. 6 and described above) and following the above mathematical processes and symbols, yields:

$$\tilde{T}_A(\mu_x, \mu_y) = (1/2) \int_{-\infty}^{\infty} \left( F_{cy}(\mu_x - \sigma, \mu_y) \text{ sinc } 2\pi\sigma/4 \right.$$

$$\sum_{-\infty}^{\infty} \sigma(\sigma - n/p) + F_w(\mu_x - \sigma, \mu_y) \text{ sinc } 2\pi\sigma/4^{2\pi i p/2\sigma}$$

$$\left. \sum \delta(\sigma - n/p) \right) d\sigma \qquad (19)$$

If we consider only the spatial frequency spectrum at the $n=0$ order ($\sigma=0$); equation (19) reduces to:

$$\tilde{T}_A(\mu_x,\mu_y) \big|_{n=0} = (1/2) [F_{cy}(\mu_x,\mu_y) + F_w(\mu_x,\mu_y)]$$

(20)

This distribution is essentially the cyan image spectrum but not exactly since a red image contribution is still present in the $F_w(\mu_x,\mu_y)$ spectrum. However, since $F_w(\mu_x,\mu_y) = F_{red}(\mu_x,\mu_y) + F_{cy}(\mu_x,\mu_y)$, equation (20) can be written as $$\tilde{T}_A(\mu_x,\mu_y) \big|_{n=0} = F_{cy}(\mu_x,\mu_y) + (1/2)F_{red}(\mu_x,\mu_y).$$

(21)

Performing the retransformation of the spectral distribution defined by equation (21) yields a reconstruction, in coordinates $u,v$:

$$T_A(u,v) = I_{cy}(u,v) + (1/2)I_{red}(u,v) \tag{22}$$

which represents a color separation which is predominantly cyan in content.

Considering now the fundamental ($n=1$) spectral order, $\sigma=1/p$ and equation (19) reduces to $$\tilde{T}_A(\mu_x,\mu_y)|_{n=\pm 1} = (1/2)[(2/\pi)F_{cy}(\mu_x - 1/p,\mu_y) - (2/\pi)F_w(\mu_x - 1/p,\mu_y)]. \tag{23}$$

But equation (24) can be reduced to $$\tilde{T}_A(\mu_x,\mu_y)|_{n=\pm 1} = (1/\pi)F_{red}(\mu_x - 1/p,\mu_y) \tag{24}$$

which is the exact red separation scene spectrum.

Retransforming equation (24) produces the relation:

$$T_A(u,v) = e^{2\pi i u p/2} I_{red}(u,v) \tag{25}$$

Equation (25) squared defines an intensity distribution which represents a pure red color separation image of the scene.

$$T_I(u,v) = I^2_{red}(u,v) \tag{26}$$

A number of ways are available for implementing such a two-color technique. One way is to first record the full color scene in a normal copy camera on a panchromatic black-and-white film through a subtractive filter (cyan, for example), placing a grating over the exposed record and re-exposing through a filter of the complementary color (red, in this instance). Since the additive red and cyan exposures are equivalent to a full spectrum exposure, the resulting composite record represents an interlace of a full spectrum image with a cyan color separation image. The record thus formed is preferably (although not mandatorily) reversal processed to a gamma of minus two, for example, by first developing for five minutes in DK-50 (2:1) at 68° F., washing for 30 seconds, bleaching in a dichromate bleach for 3 minutes, washing and cleaning, flooding for 20 seconds under a 100 watt lamp, developing a second time in D-94 for 2 minutes, washing again, fixing, hypo-neutralizing, and then drying.

Figure 8:
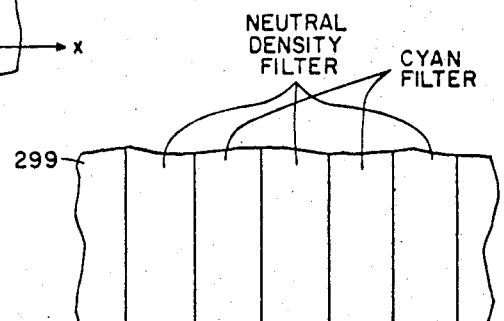
FIG. 8 is a fragmentary schematic view of a spectral filter useful for forming the composite record shown in FIG. 7.

A preferred technique for producing such a composite record on which a full spectrum scene image is interlaced with a subtractive color (cyan, for example) separation image of the scene is to employ a spectral filter in the nature of a grating having alternate neutral density and cyan filter strips, as shown fragmentarily at 299 in FIG. 8. Such a filter 299 may be fabricated in a number of ways, e.g., by color photographic techniques described in my above-referenced copending application Ser. No. 795,879, now U.S. Pat. No. 3,586,434; or, preferably, by the use of multi-layer interference filter fabrication methods.

With such a filter, a composite record as described is formed very simply by erecting an image of the scene, multiplying the image with the filter, and recording the multiplicative combination on a panchromatic black-and-white emulsion. In a preferred arrangement, the filter is located at the plane of the first image formed of the scene in intimate contact with the film.

Figure 9:
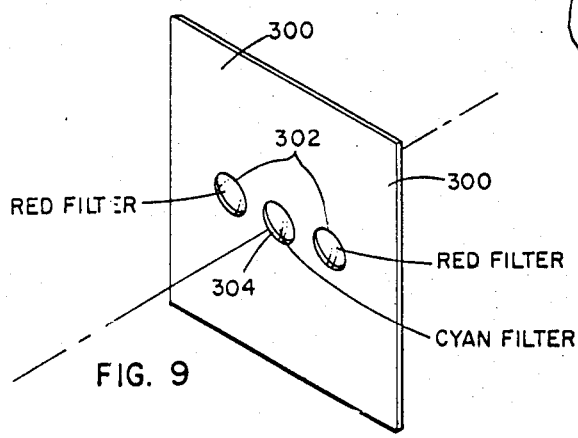
FIG. 9 shows a spatial filter mask useful in the practice of two-color spectral zonal photography in accordance with this invention.
Figures 10, 11, 12:
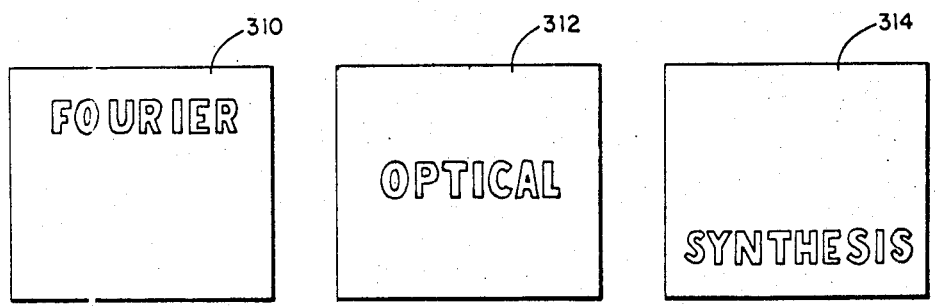
FIGS. 10-13 illustrate hypothetical objects useful in an illustration of the inventive concepts.
Figure 13:
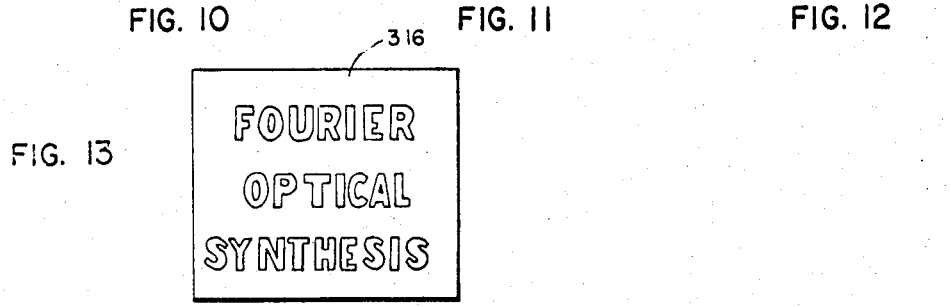

After processing the exposed storage medium, a color reconstruction of considerable fidelity may be retrieved from the record in a coherent optical system substantially as shown in FIG. 6, described above, but modified by the substitution of a spatial filter mask 300 as shown in FIG. 9 for the mask 258. The mask 300 has a pair of apertures 302 for passing the first order spectra produced by the record and a third aperture 304 located on the optical axis for passing the zeroth order information. Apertures 302 are covered by a red spectral filter and aperture 304 is covered by a cyan spectral filter in order that spectra passed by mask 300 be transmitted in light having the corresponding wavelength characteristics. As described above, the information transmitted in the diffracted orders through the apertures 302 characterize a spatial frequency spectrum associated with the red content of the photographed scene, and the information transmitted in the D.C. channel through the aperture 304 characterizes a spatial frequency spectrum which represents predominantly the cyan content of the scene.

Records of the reproductions which I have generated using this system do not exhibit a full spectrum of natural colors, due to the inherent limitations of two color systems and the described adulteration of the cyan spectra; however, the color reproductions are found to be very aesthetically pleasing and highly saturated in the colors transmitted in predominance by the system. Thus, a system has been described which for the first time makes practicable spectral zonal photography with colorless record media. The only additional requirement imposed by the described system over conventional black-and-white photography is the introduction of a spectral filter into the exposing light, as described. In its simplest application, a conventional camera is modified by permanently locating a spectral filter, as described, at the image plane of the objective.

Thus far, the Fourier optical synthesis principles have been mathematically and physically analyzed in terms of a one-dimensional carrier in the interest of simplicity. The underlying principles are more general, however. Various difference signals can be generated by extending the basic concept of the one-dimensional interlace scheme above to a two-dimensional scheme.

In the following analysis, let $I_i(x,y)$ represent the amplitude transmittance of the $i^{th}$ record image after processing. The total amplitude transmittance of the record, then, is:

$$T_A(x,y) = I_1(x,y) P(x) P(y) + I_2(x,y) P(x+p/2) P(y) + I_3(x,y) P(x+p/2) P(y+p/2) + I_4(x,y) P(x) P(y+p/2). \tag{27}$$

The Fourier transform of:
$$P(x) \rightarrow \tilde{P}(\sigma) \tag{28}$$
$$P(x+p/2) \rightarrow \tilde{P}'(\sigma) = e^{2\pi i \sigma p/2}\tilde{P}(\sigma) \tag{29}$$
$$P(y) \rightarrow \tilde{P}(\xi) \tag{30}$$
$$P(y+p/2) \rightarrow \tilde{P}'(\xi) = e^{2\pi i \xi p/2}\tilde{P}(\xi) \tag{31}$$

Therefore, the Fourier Transform of equation (27) in variables $\mu_x$, $\mu_y$ and dummy variables of integration $\sigma$, $\xi$ is $$\tilde{T}_A(\mu_x, \mu_y) = \int_{-\infty}^{\infty}\int_{-\infty}^{\infty} [\tilde{I}_1(\mu_x-\sigma, \mu_y-\xi)\tilde{P}(\sigma)\tilde{P}(\xi)$$
$$+ \tilde{I}_2(\mu_x-\sigma, \mu_y-\xi)e^{2\pi i \sigma p/2}\tilde{P}(\sigma)\tilde{P}(\xi)$$

$$+ \tilde{I}_3(\mu_x-\sigma, \mu_y-\xi)e^{2\pi i(\sigma+\xi)p/2}\tilde{P}(\delta)\tilde{P}(\xi)$$

$$+ \tilde{I}_4(\mu_x-\sigma, \mu_y-\xi)e^{2\pi i \xi p/2}\tilde{P}(\sigma)\tilde{P}(\xi)]d\sigma d\xi \quad (32)$$

where $n$ represents delta function components (orders) in the $\mu_x$ dimension, $m$ represents delta function components in the $\mu_y$ dimension, and $$\tilde{P}(\sigma) = (1/2)\, \text{sinc}\,(2\pi\sigma p/4) \sum_{n=-\infty}^{\infty} \delta(\sigma - n/p) \quad (33)$$

$$\tilde{P}(\xi) = (1/2)\, \text{sinc}\,(2\pi\xi p/4) \sum_{m=-\infty}^{\infty} \delta(\xi - m/p) \quad (34)$$

Evaluating equation (32) for the orders $n=\pm1$, $m=0$ ($\sigma=1/p, \xi=0$):

$$\tilde{T}_A(\mu_x, \mu_y)\Big|_{\substack{n=\pm 1 \\ m=0}} = (1/2\pi)[\tilde{I}_1(\mu_x - 1/p, \mu_y)$$

$$- \tilde{I}_2(\mu_x - 1/p, \mu_y) - \tilde{I}_3(\mu_x - 1/p, \mu_y)$$

$$+ \tilde{I}_4(\mu_x - 1/p, \mu_y)] \quad (35)$$

Considering the $n=\pm1$, $m=\pm1$ orders ($\sigma=1/p, \xi=1/p$):

$$\tilde{T}_A(\mu_x, \mu_y)\Big|_{\substack{n=\pm 1 \\ m=\pm 1}} = (1/\pi)^2[\tilde{I}_1(\mu_x - 1/p, \mu_y - 1/p)$$

$$- \tilde{I}_2(\mu_x - 1/p, \mu_y - 1/p) + \tilde{I}_3(\mu_x - 1/p, \mu_y - 1/p)$$

$$- \tilde{I}_4(\mu_x - 1/p, \mu_y - 1/p)] \quad (36)$$

For $n=0, m=\pm1$ $$\tilde{T}_A(\mu_x, \mu_y)\Big|_{\substack{n=0 \\ m=\pm 1}} = (1/2\pi)[\tilde{I}_1(\mu_x, \mu_y - 1/p)$$

$$+ \tilde{I}_2(\mu_x, \mu_y - 1/p) - \tilde{I}_3(\mu_x, \mu_y - 1/p)$$

$$- \tilde{I}_4(\mu_x, \mu_y - 1/p)] \quad (37)$$

And, finally for $n=0, m=0$ $$\tilde{T}_A(\mu_x, \mu_y)\Big|_{\substack{n=0 \\ m=0}} = (1/4)[\tilde{I}_1(\mu_x, \mu_y) + \tilde{I}_2(\mu_x, \mu_y)$$

$$+ \tilde{I}_3(\mu_x, \mu_y) + \tilde{I}_4(\mu_x, \mu_y)] \quad (38)$$

As indicated, the equations (35–38) are general. In one application of the invention, let $$I_4(x,y) = I_1(x,y) + I_2(x,y) + I_3(x,y). \quad (39)$$

Then the following reductions occur:

$$\tilde{T}_A(\mu_x, \mu_y)\Big|_{\substack{n=\pm 1 \\ m=0}} = (1/\pi)\tilde{I}_1(\mu_x - 1/p, \mu_y) \quad (40)$$

$$\tilde{T}_A(\mu_x, \mu_y)\Big|_{\substack{n=\pm 1 \\ m=\pm 1}} = -2(1/\pi)^2 \tilde{I}_2(\mu_x - 1/p, \mu_y - 1/p) \quad (41)$$

$$\tilde{T}_A(\mu_x, \mu_y)\Big|_{\substack{n=0 \\ m=\pm 1}} = -(1/\pi)\tilde{I}_3(\mu_x, \mu_y - 1/p) \quad (42)$$

$$\tilde{T}_A(\mu_x, \mu_y)\Big|_{\substack{n=0 \\ m=0}} (1/2)[\tilde{I}_1(\mu_x, \mu_y)$$

$$+ \tilde{I}_2(\mu_x, \mu_y) + \tilde{I}_3(\mu_x, \mu_y)] \quad (43)$$

Upon retransforming, $$T_A(u, v)\Big|_{\substack{n=\pm 1 \\ m=0}} = (1/\pi)e^{2\pi i u p/2}I_1(u, v), \quad (44)$$

$$T_A(u, v)\Big|_{\substack{n=\pm 1 \\ m=\pm 1}} = -2(1/\pi)^2 e^{2\pi i (u+v)p/2}I_2(u, v), \quad (45)$$

$$T_A(u, v)\Big|_{\substack{n=0 \\ m=\pm 1}} = (1/\pi)e^{2\pi i v p/2}I_3(u, v), \quad (46)$$

and $$T_A(u, v)\Big|_{\substack{n=0 \\ m=0}} = (1/2)[I_1(u, v) + I_2(u, v) + I_3(u, v)], \quad (47)$$

with the corresponding image intensity distributions $$T_I(u, v)\Big|_{\substack{n=\pm 1 \\ m=0}} \propto I_1^2(u, v) \quad (48)$$

$$T_I(u, v)\Big|_{\substack{n=\pm 1 \\ m=\pm 1}} \propto I_2^2(u, v), \quad (49)$$

$$T_I(u, v)\Big|_{\substack{n=0 \\ m=\pm 1}} \propto I_3^2(u, v), \quad (50)$$

and $$T_I(u, v)\Big|_{\substack{n=0 \\ m=0}} \propto I_4^2(u, v). \quad (51)$$

The validity of the above mathematical statements may be substantiated as follows. Expose a photographic emulsion sequentially to objects 310, 312, 314, and 316 (shown in FIGS. 10–13), object 316 representing the optical sum of objects 310, 312, and 314. While so doing, multiply a mask 318, as shown in FIG. 14, with the respective objects, shifting the mask 318 after each exposure by one-half period $p$ to expose the entire film area. A mosaic composite record is thus formed comprising a two-dimensional array of four element mosaic units, as shown in FIG. 15.

Process the composite record to a transparency and locate same in a coherent optical system such as is shown in FIG. 6. The diffraction pattern formed, comprising a Fourier transformation of the complex amplitude transmittance function of the record, appears (in part) as shown in FIG. 16.

Assume that images $I_1$, $I_2$, $I_3$, and $I_4$, as shown in FIG. 15, are respectively images of objects 1K, 1L, 1M, and 1N. Then, by selectively transmitting through Fourier transform space (with a spatial filter mask similar to masks 258 described above) the $n=\pm1$, $m=0$ orders, an image $I_1(u,v)$ (the word "FOURIER") alone is retrieved. Similarly, the words "OPTICAL" and "SYNTHESIS" alone may be recovered by filtering out all spectra in the transform plane except the orders $n=\pm1, m=\pm0$; and $n=0, m=\pm1$. Filtering for $m=n=0$ recovers the sum function $I_4(u,v)$.

The results obtained from the assumption of equation (36) are particularly useful to implement a system for three zone spectral photography. For spectral zonal photography all that is required is a particularly simple mosaic filter 322 of the geometry shown schematically in FIG. 17 wherein the symbols G, R, B, and N respectively represent green, red, blue, and neutral spectral filter elements.

Figure 19:
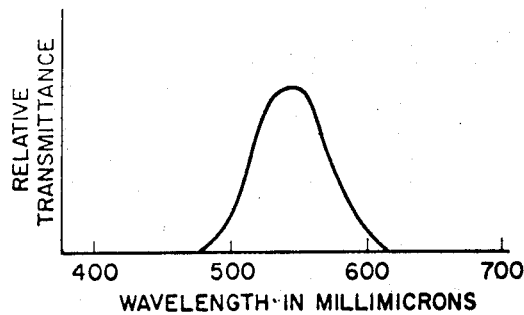
Figure 20:
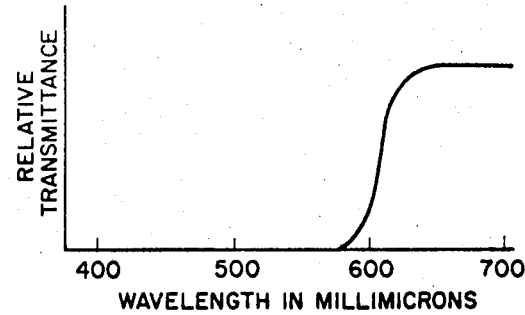
Figure 21:
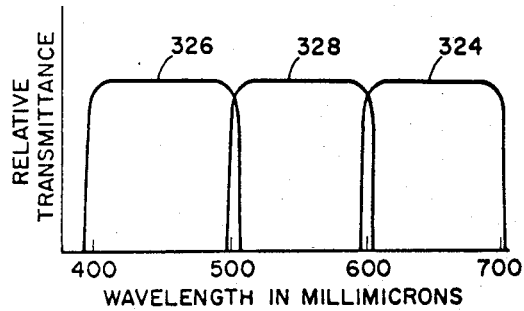
FIG. 21 depicts ideal spectral characteristics for the blue, green and red filter elements in the FIG. 17 filter.

The FIG. 17 filter will now be described in more detail. By way of example, the spectral characteristics of the red, blue, and green elements of the FIG. 17 filter might be as shown diagrammatically in FIGS. 18, 19, and 20, respectively. The fourth element has been characterized above as having neutral spectral characteristics. If the spectral characteristics of the red, blue, and green filter elements were ideal as shown, for example, in FIG. 21 at 324, 326, and 328, respectively, the neutral element would be selected to have as nearly as possible 100 percent transmission throughout the visible region of the electromagnetic wave spectrum. However, assuming the red, blue, and green filter elements to have practically achievable spectral characteristics as represented in FIGS. 18–20, then the neutral element should, ideally, have a spectral characteristic representing the sum of the spectral characteristics of the red, blue, and green elements, as represented by curve 330 in FIG. 22. Because of the practical difficulty in fabricating a neutral filter having the spectral characteristics depicted by the curve 330, in practice I have found that a neutral element having a spectrally flat transmittance characteristic, for example as represented by line 332 in FIG. 22, established at a level representing substantially the average of the sum of the spectral characteristics of the red, blue, and green elements (i.e., the average of curve 330), has yielded very satisfactory results.

Stated in another way, and considering for example the blue information channel, it is desirable (in order to avoid producing spurious modulation in a direction orthogonal to the direction of the blue signal carrier) for the same amount of blue light (per unit of area) to pass through the neutral elements as passes through the blue elements. It follows, then, that because practical spectral filters do not have a flat bandpass characteristic and reflect or absorb a certain amount of the light incident thereon, the neutral elements must be given an equivalent amount of average neutral density if this condition is to be met. It can be readily envisioned from a study of FIG. 17 and this specification that if different amounts of blue light energy are recorded on areas of a photosensitive medium located behind the neutral and blue elements of the filter, then upon development of the medium a spatial carrier will be formed on the record having a direction vector orthogonal to the direction vector of the blue channel. The direction vector of the blue channel is vertical in FIG. 17.

By similar reasoning, in order to prevent spurious modulation of blue light by the red and green elements, the spectral characteristics of these elements should also be matched in their rejection of blue light. The above description of the blue channel applies equally to the green and red channels.

As described above, to record spectral zonal information with filter 322, the filter 322 is multiplied with an image of the scene to be photographed and the product is recorded on a panchromatic emulsion.

Alternatively, the composite record may be made by four consecutive exposures through a position-sequenced mask, such as mask 318 in FIG. 14, while appropriately imposing red, green and blue spectral filters in the exposure light path.

Figure 23:
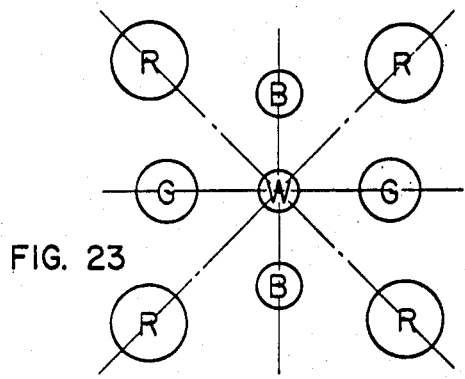
FIG. 23 is a highly schematic fragmentary representation of an optical Fourier transform of a record made using the FIG. 17 filter.

A record formed as described may be placed in a coherent projection system similar to the system shown in FIG. 6. At a Fourier transform space within the system (occupied by the mask 258 in FIG. 6) will appear an array of spectral orders surrounding the optical axis in a square geometry. The first spectral orders of such an array are shown schematically in FIG. 23. A mask similar to the mask 258 shown in FIG. 6 but having apertures arrayed around the optical axis in the same geometry as exhibited by the array of spectral orders shown in FIG. 23 may be employed. Red, blue, and green filters would be located in the mask at the positions noted in FIG. 23, whereupon a full color reproduction of the scene recorded would be reproduced at the output plane, which may be a screen as shown at 256 in FIG. 6.

Following the teachings of this invention, an alternative three-zone spectral zonal filter may be fabricated which comprises a two-dimensional square checkerboard-like distribution of mosaic units as in the FIG. 17 filter, but which is made up of four elements, three of which characterize optical subtractive primaries and the fourth of which has substantial neutral density. Such a filter is illustrated schematically in FIG. 24 wherein the letters C, M, Y, and N.D. represent, respectively, cyan, magenta, yellow, and neutral density elements.

For reasons similar to those discussed above in describing the spectral characteristics of the FIG. 17 filter 322, it is desirable (considering again, for example, the blue information channel) that the same amount of blue light (per unit of area) which is transmitted through the yellow filter is also transmitted through the neutral density filter. If it were possible to fabricate a yellow filter having ideal spectral characteristics (i.e., 100 percent rejection of blue light in the blue region, and 100 percent transmission throughout the remainder of the visible spectrum), then the ideal neutral density element would be infinitely dense and thus non-transmissive of any blue light. However, since such ideal filters are not practicable, in practice a certain amount of blue light will pass through the yellow filter elements. It is desirable that the same amount of blue light transmitted through the neutral density elements in order to assure that no spurious modulation is recorded in a direction orthogonal to the vectorial direction of the desired modulation (i.e., vertical in FIG. 24).

Again by reasoning similar to the above, it is desirable that the cyan and magenta filter elements pass equal amount of blue light (ideally 100 percent).

The above description regarding the spectral characteristics of the filter elements considering the blue channel applies equally to the red and green information channels.

In practice, I have found that rather than trying to match the rejection characteristics of each of the yellow, cyan, and magenta elements to the neutral density element, very satisfactory results are obtained if the amount of neutral density in the neutral density element is balanced with respect to the subtractive primary elements having in practice the best rejection efficiency, normally the yellow filter elements. Any errors in failure to match the cyan and magenta elements with neutral density elements matched to the yellow filter elements will have no significant effect, I have found, on the fidelity of the reproductions formed, since any errors in recording are significant only at very high exposure levels at which degradation of the reproduced images due to unrelated factors is more serious.

Figure 22:
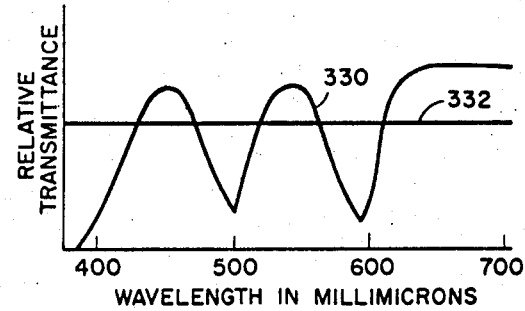
FIG. 22 depicts ideal and suitable practicable spectral characteristics of a neutral element comprising part of the FIG. 17 filter.
Figure 24:
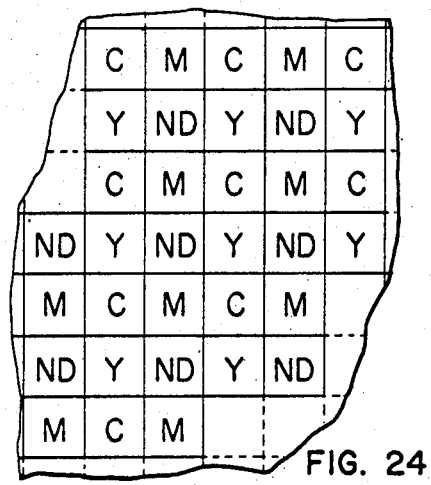
FIG. 24 is a schematic illustration of another filter which might be constructed according to the principles of this invention.

The product of a filter as shown at FIG. 24 and described above and an image of a colored object may be recorded on a panchromatically sensitive black-andwhite emulsion as described above. Placing a developed record taken through the FIG. 24 filter will produce in the Fourier transform plane of a projection system as shown at FIG. 6 an array of spectral orders identical in position and information content to the array produced by the FIG. 17 filter, as shown at FIG. 22.

Whereas this invention has been described as being capable of implementation by mosaic filters having a generally checkerboard-like square geometry, implementation of this invention is not limited to such a geometry. Other filters may be devised according to this invention which comprise a two-dimensional pattern of like mosaic units arranged so as to be periodic in two directions, each mosaic unit comprising four filter elements having different spectral exclusionary characteristics, the spectral characteristics of three of the four elements being associated primarily with different bands of radiation wavelengths, the fourth element being a substantially spectrally neutral element. An example is a filter having filter elements arranged in a hexagonal honeycomb-like distribution such that each of the four elements is surrounded by three pairs of the remaining three elements, the pair constituents of each pair being located in diametric opposition.

Figure 25:
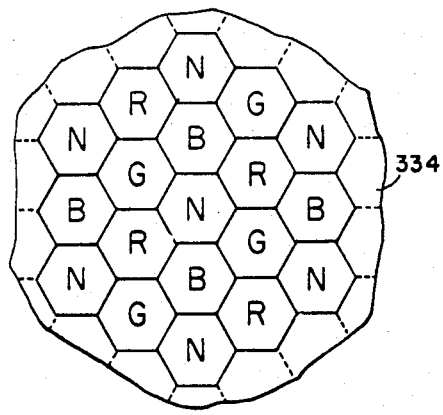
FIG. 25 shows still another filter embodying this invention.

Such a hexagonal filter is shown in FIG. 25 at 334. The filter 334 is illustrated as having spectral characteristics of the additive primary type corresponding to the FIG. 17 checkerboard filter. The spectral characteristics of the red, blue, green, and neutral areas in the hexagonal filter 334 may be selected as described with respect to the FIG. 17 filter. It should be understood that the filter 334 and the other filters illustrated herein are greatly exaggerated in size, the filter elements in a useful filter having, for example, 10–200 filter elements per millimeter. The filter 334 may be employed to record spectral zonal information, as described above, for example, by placing it in contact with a photosensitive material disposed at the plane in which a scene image or reimage is formed.

Figure 26:
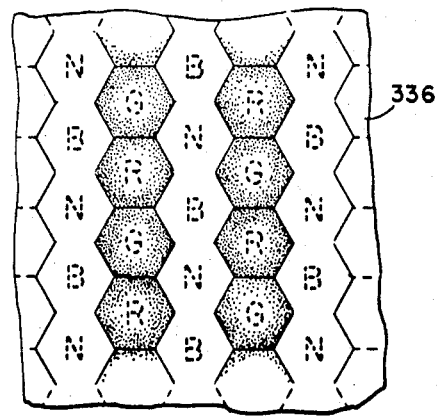
FIG. 26 depicts schematically a photostorage record as it might appear if exposed through the FIG. 25 filter to blue light and developed to a positive.

FIG. 26 may assist in an understanding of the operation of the filter 334 (and the other filter embodiments described above as well). FIG. 26 is intended to represent diagrammatically a portion of a photographic record 342, developed to a positive, which has been exposed to a blue scene image, or to a blue portion of a multi-color scene image through filter 334.

The broken line literal notations designate the character of the light which impinged on the record, as determined by the spectral characteristics of the filter 334.

It can be seen from an inspection of FIG. 26 that the areas of the record 342 which were located behind the blue and neutral filter elements received a high exposure since blue light passed through the blue and neutral filter elements substantially without attenuation. The areas of the record 342 which were located behind the red and green filter elements are seen to have received a relatively low exposure (ideally zero), the green and red filter elements (assuming them to have ideal spectral characteristics) blocking substantially all blue light.

Thus, it can be seen that a spatial carrier for the blue scene information is created, the spatial carrier (for the FIG. 25 filter orientation) having a horizontal direction vector.

If a photographic transparency record, as shown at 336, is placed in a coherent projection system as shown, for example, in FIG. 6, a diffraction pattern will be formed in a Fourier transform space within the system which represents an optical Fourier transform of the photographic record. Such a pattern 338 is depicted schematically in FIG. 27, the first and zeroth spectral orders only being shown as they might appear after appropriate color filtering as discussed below.

Figure 27:
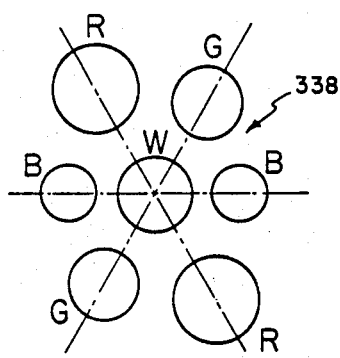
FIG. 27 depicts schematically an optical Fourier transform of a record made using the FIG. 25 filter.

It can be seen from FIG. 27 that the pattern 338 has six first spectral orders representing three pairs of orders containing the blue, green, and red information arrayed around the optical axis. The first spectral orders carry literal notations designating the color information carried by each. If red, blue, and green filters are placed in the corresponding first spectral orders, and the zeroth order (labeled W) is attenuated (or at least partially attenuated) a full color reconstruction of the scene will be reproduced at the output plane (occupied by the screen 256 in the FIG. 6 system).

The FIG. 27 diffraction pattern illustrates progressively larger spectral orders at progressively greater distances from the optical axis for information-bearing light of longer wavelength. This result follows from the well known laws of diffraction that longer wavelength light is diffracted at a greater diffraction angle than light of shorter wavelength.

Figure 28:
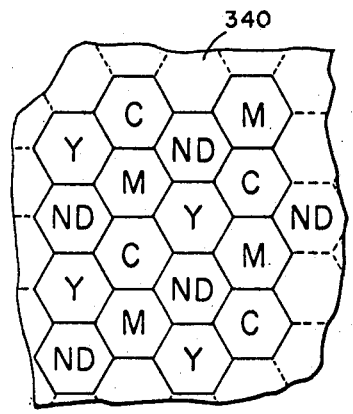
FIG. 28 schematically illustrates yet another embodiment of the invention.

FIG. 28 illustrates yet another filter 340 having the same hexagonal geometry as the FIG. 25 filter, but having spectral characteristics of the subtractive primary type as described above with respect to the FIG. 24 filter. The spectral characteristics of the yellow, cyan, magenta, and neutral density elements in the FIG. 28 filter 340 may be selected as described above with respect to the FIG. 24 filter elements.

Figure 29:
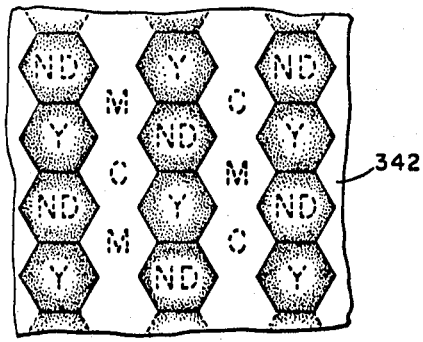
FIG. 29 depicts schematically a photostorage record as it might appear if exposed through the FIG. 28 filter to blue light and developed to a positive.

FIG. 29 illustrates diagrammatically a photographic record 342, developed to a positive, which has been exposed through the FIG. 28 filter. In order to show the functional equivalence of the FIGS. 25 and 28 filters, FIG. 29 depicts the results of an exposure to a blue scene image, or a blue portion or blue content of a multi-color scene image. The exposed areas of the negative 342 are again labeled to designate the filter elements through which each area was exposed.

It becomes manifest upon an inspection of FIG. 29, that the areas of the record 342 which were located behind the cyan and magenta elements (each of which transmit blue light without substantial attenuation) receive a high exposure and appear white (clear in a transparency) in the record 342. Because blue light is substantially totally attenuated by the neutral density and yellow filter elements, the record 342 exhibits a low (ideally zero) exposure in the areas of the record 342 which were located behind these elements. Thus, again the blue scene information is recorded as a modulation of a spatial carrier having (for the FIG. 28 filter orientation and geometry) a horizontal direction vector. The record 342, if substituted for the record 336 in the FIG. 6 projection system, would produce a substantially identical diffraction pattern, as shown in FIG. 27.

It is significant to note in connection with a description of the hexagonal filters 334, 340, as contrasted for example with the checkerboard filters illustrated in FIGS. 17 and 24, that the information is recorded with radial symmetry. All three color channels are thus sampled at the same spatial frequency. Because the angular separation between the playback channels (60°) is greater than for the FIGS. 17 and 24 filters (45°), larger spatial filter apertures may be employed during playback and thus more light may be transmitted to the output plane.

Whereas storage of color information in three unique spectral zones by the use of mosaic filters as described above has significant advantages for practical hand-held photography, there are applications where the same color information can be recorded by a sequential process, as discussed above with respect to FIGS. 14–15. Reference may be had for a description of applicable multiple step sequential exposure processes to my copending application Ser. No. 795,879, now U.S. Pat. No. 3,586,434.

The encoding filters described above may be fabricated by any of a number of methods; however, employment of multi-layer interference filter fabrication methods are preferred because of the high maximum transmission and the controlled spectral characteristics of the filters which can be produced by these methods.

The invention is not limited to the particular details of construction of the embodiments depicted, and it is contemplated that various and other modifications and applications will occur to those skilled in the art. Filters having geometries other than those shown are contemplated. For example, the square checkerboard geometry of the FIGS. 17 and 24 filters may be skewed to produce a mosaic filter in which the mosaic units and individual filter elements have a diamond shape. Further, the duty cycle of one or more of the filter elements (the fraction of a carrier period occupied by a filter element) may be varied to control the playback efficiency of one or more of the color channels.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. A mosaic three zone spectral zonal encoding filter for use in modulating incident light for making a record from which may be retrieved information in three spectral zones by the use of optical Fourier transformation and frequency filtering techniques, comprising a two-dimensional pattern of like mosaic units arranged so as to be spatially periodic in two directions at spatial frequencies capable of producing diffraction of light that is incident upon the filter, each mosaic unit comprising four filter elements having different spectral characteristics, the adjoining filter elements of each unit in each of said directions being spatially phase-spaced apart substantially one-half of the mosaic spatial period in that direction, the spectral characteristics of three of said filter elements in each mosaic unit being associated primarily with different bands of radiation wavelengths, the fourth element in each mosaic unit being a substantially spectrally neutral element.

2. The filter defined by claim 1 wherein said fourth filter element has a spectral characteristic which represents the sum of the spectral characteristics of the remaining three elements.

3. The filter defined by claim 2 wherein the three elements are predominantly red, blue, and green.

4. The filter defined by claim 1 wherein said fourth element has substantial neutral density and wherein the remaining three elements characterize optical subtractive primaries.

5. The filter defined by claim 4 wherein said three elements are predominantly cyan, magenta, and yellow and wherein said fourth element is substantially black.

6. The filter defined by claim 1 wherein said filter elements are arranged on said filter in a hexagonal honeycomb-like distribution, such that each of said four elements is surrounded by three pairs of the remaining three elements, the pair constituents of each pair being located in diametric opposition.

7. The filter defined by claim 6 wherein said fourth filter element has a spectral characteristic which represents the average of the sum of the spectral characteristics of the remaining three elements.

8. The filter defined by claim 7 wherein said three elements are predominantly red, blue, and green.

9. The filter defined by claim 6 wherein said fourth element has substantial neutral density and wherein the remaining three elements characterize optical subtractive primaries.

10. The filter defined by claim 9 wherein said three elements are predominantly cyan, magenta, and yellow and wherein said fourth element is substantially black.

11. The filter defined by claim 1 wherein said mosaic units and said filter elements in said units are arranged on said filter in a square checkerboard-like distribution.

12. The filter defined by claim 11 wherein said fourth filter element has a spectral characteristic which represents the average of the sum of the spectral characteristics of the remaining three elements.

13. The filter defined by claim 12 wherein said three elements are predominantly red, blue, and green.

14. The filter defined by claim 11 wherein said fourth element has substantial neutral density and wherein the remaining three elements characterize optical subtractive primaries.

15. The filter defined by claim 14 wherein said three elements are predominantly cyan, magenta, and yellow and wherein said fourth element is substantially black.

16. The filter defined by claim 1 wherein said fourth filter element has a spectral characteristic which represents the average of the sum of the spectral characteristics of the remaining three elements.

17. The filter defined by claim 16 wherein said three elements are predominantly red, blue, and green.

18. A mosaic three zone spectral zonal encoding filter for use in modulating incident light for making a record from which may be retrieved information in three spectral zones by the use of optical Fourier transformation and frequency filtering techniques, comprising a two-dimensional pattern of like mosaic units arranged so as to be spatially periodic in two directions at spatial frequencies capable of producing diffraction of light that is incident upon the filter, each mosaic unit comprising four filter elements having different spectral characteristics, the adjoining filter elements of each unit in each of said directions being spatially phase-spaced apart substantially one-half of the mosaic spatial period in that direction, the spectral characteristics of three of said filter elements in each mosaic unit being associated primarily with different bands of radiation wavelengths, the fourth element in each mosaic unit being a substantially spectrally neutral element, said filter elements being arranged on said filter in a hexagonal honeycomb-like distribution such that each of said four elements in a mosaic unit is surrounded by three pairs of the remaining three elements, the pair constituents of each pair being located in diametric opposition.

19. The filter defined by claim 18 wherein said three elements are respectively, predominantly cyan, magenta and yellow and wherein said fourth element is substantially black.

20. A mosaic three zone spectral zonal encoding filter for use in modulating incident light for making a record from which may be retrieved information in three spectral zones by the use of optical Fourier transformation and frequency filtering techniques, comprising a square checkerboard-like pattern of like mosaic units arranged so as to be spatially periodic in two orthogonal directions at spatial frequencies capable of producing diffraction of light that is incident upon the filter, each mosaic unit comprising four filter elements having different spectral characteristics, the adjoining filter elements of each unit in each of said directions being spatially phase-spaced apart substantially one-half of the mosaic spatial period in that direction, the spectral characteristics of three of said filter elements in each mosaic unit being primarily cyan, yellow, and magenta and the fourth element in each mosaic unit being substantially black.

21. A mosaic three zone spectral zonal encoding filter for use in modulating incident light for making a record from which may be retrieved information in three spectral zones by the use of optical Fourier transformation and frequency filtering techniques, comprising a square checkerboard-like pattern of like mosaic units arranged so as to be spatially periodic in two orthogonal directions at spatial frequencies capable of producing diffraction of light that is incident upon the filter, each mosaic unit comprising four filter elements each having different spectral characteristics, the adjoining filter elements of each unit in each of said directions being spatially phase-spaced apart substantially one-half of the mosaic spatial period in that direction, the spectral characteristics of three of said filter elements in each mosaic unit being primarily red, blue, and green, the fourth element in each unit being a highly transmissive spectrally neutral element.

* * * * *